(12) United States Patent
Rhoades et al.

(10) Patent No.: US 8,827,153 B1
(45) Date of Patent: Sep. 9, 2014

(54) SYSTEMS AND METHODS FOR WAVEFORM GENERATION FOR DYNAMIC MAGNETIC STRIPE COMMUNICATIONS DEVICES

(75) Inventors: Randy L. Rhoades, Swissvale, PA (US); David J. Hartwick, Aliquippa, PA (US)

(73) Assignee: Dynamics Inc., Pittsburgh, PA (US)

( * ) Notice: Subject to any disclaimer, the term of this patent is extended or adjusted under 35 U.S.C. 154(b) by 98 days.

(21) Appl. No.: 13/551,176

(22) Filed: Jul. 17, 2012

Related U.S. Application Data

(60) Provisional application No. 61/509,033, filed on Jul. 18, 2011.

(51) Int. Cl.
*G06K 5/00* (2006.01)

(52) U.S. Cl.
USPC .......................................... 235/380; 235/449

(58) Field of Classification Search
USPC ........................... 235/380, 449, 493, 492, 382
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,357,563 A * | 10/1994 | Hamilton et al. | 379/91.01 |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Thien M Le

(57) ABSTRACT

Dynamic magnetic stripe communications devices are provided as magnetic stripe emulators. A device, such as an application specific integrated circuit, may include a waveform generator that retrieves data from memory and may generate waveforms from the retrieved data to be communicated by the magnetic stripe emulator and received by a magnetic stripe reader.

20 Claims, 7 Drawing Sheets

(56) References Cited

U.S. PATENT DOCUMENTS

| | | |
|---|---|---|
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 * | 8/2006 | Cooper .................... 235/449 |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 * | 8/2010 | Mullen et al. .................. 235/380 |
| 7,828,207 B2 | 11/2010 | Cooper |
| 8,231,063 B2 * | 7/2012 | Poidomani et al. ........... 235/492 |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2004/0238644 A1 * | 12/2004 | Leaming ...................... 235/492 |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |

(56) References Cited

U.S. PATENT DOCUMENTS

| | | |
|---|---|---|
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159700 A1 | 6/2009 | Mullen |
| 2009/0159704 A1 * | 6/2009 | Mullen et al. .................. 235/493 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |
| 2011/0284640 A1 * | 11/2011 | Mullen et al. .................. 235/469 |
| 2012/0052800 A1 * | 3/2012 | Bona et al. .................... 455/41.1 |
| 2012/0205451 A1 * | 8/2012 | Poidomani et al. ........... 235/492 |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

SYSTEMS AND METHODS FOR WAVEFORM GENERATION FOR DYNAMIC MAGNETIC STRIPE COMMUNICATIONS DEVICES

CROSS-REFERENCE TO RELATED APPLICATION

This application claims the benefit of U.S. Provisional Patent Application No. 61/509,033, titled "SYSTEMS AND METHODS FOR WAVEFORM GENERATION FOR DYNAMIC MAGNETIC STRIPE COMMUNICATIONS DEVICES," filed Jul. 18, 2011, which is hereby incorporated by reference herein in its entirety.

BACKGROUND OF THE INVENTION

This invention relates to powered cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader. A magnetic emulator, for example, may generate a data encoded analog waveform to communicate the encoded data to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a merchant code or incentive code. The code may be received by the card via manual input (e.g., onto buttons of the card) or via a wireless transmission (e.g., via light, electromagnetic communications, sound, or other wireless signals). A code may be communicated from a webpage (e.g., via light and/or sound). A card may include a display such that a received code may be visually displayed to a user. In doing so, the user may be provided with a way to select, and use, the code.

A dynamic magnetic stripe communications device may include a magnetic emulator that comprises an inductor (e.g., a coil). Current may be provided through this coil to create an electromagnetic field operable to communicate with the read-head of a magnetic stripe reader. A waveform generator may fluctuate the amount of current travelling through the coil such that one or more tracks of magnetic stripe data encoded within the analog waveform may be communicated to a read-head of a magnetic stripe reader.

Accordingly, for example, a numeric (e.g., digital) representation of a waveform (e.g., an F2F encoded waveform) may be stored within a memory of a card. Several such waveforms may, for example, be stored within a memory of a card and may be encoded with one, two, and/or three tracks of magnetic stripe data. Portions of a waveform (e.g., one or more bit periods of a waveform) may be stored within a memory of a card. Portions of a waveform may be retrieved from memory and concatenated to form a complete waveform that may be saved into a memory of a card for future use and/or communicated after concatenation.

An application specific integrated circuit (ASIC) may, for example, be used to store and/or communicate a waveform to a read-head of a magnetic stripe reader. Other components, such as a mixed-signal FPGA, a data acquisition microcontroller, a system on a chip, or any other component may be used as well. Memory internal to the ASIC or memory external to the ASIC may, for example, store an array of numbers (e.g., symbols), where the array of symbols may be a digital representation of a waveform. All symbols in the array may, for example, be provided to a conversion device (e.g., a DAC within the ASIC) to be converted to an analog waveform. The analog waveform may, for example, be amplified and filtered before being provided to a coil of a magnetic emulator.

Accordingly, for example, a processor of a card may receive manual input (e.g., a button press) from a user of the card to retrieve a digital waveform from a memory on the card, where the digital waveform may be associated with the feature selected by the button press. The processor may, for example, communicate with a waveform generator on the card to cause the retrieved digital waveform to be converted to an analog waveform. The analog waveform may be applied to a coil of a magnetic emulator so that information may be communicated to a read-head of a magnetic stripe reader via the analog waveform.

In so doing, one or more magnetic stripe messages may be stored as one or more digital waveforms within a memory of a card. Each component of each digital waveform (e.g., each symbol of a waveform) may be retrieved from memory, optionally digitally filtered or manipulated, converted to an analog signal, and optionally amplified and filtered before being applied to a coil of a magnetic emulator for communication to a read-head of a magnetic stripe reader.

A conversion rate implemented by a DAC of a waveform generator of a card may be used to modify a rate that data is communicated by a waveform to a magnetic read head. For example, if a relatively slow swipe speed is to be emulated, then a corresponding slow conversion rate may be implemented by the DAC so that a rate of data communicated by the waveform may be decreased. Alternately, for example, if a relatively high swipe speed is to be emulated, then a corresponding fast conversion rate may be implemented by the DAC so that a rate of data communicated by the waveform may be increased. An amplitude and/or waveshape of a waveform may, for example, be altered based upon a swipe speed that is to be emulated.

Several waveforms may be stored within a memory of a card. Accordingly, for example, a different waveform may be recalled from memory and communicated by a processor or other device of a card to communicate payment information (e.g., a payment account number or code) to a read-head of a magnetic stripe reader. In so doing, different account information may be communicated depending upon which waveform is recalled from memory. A button on a card may, for example, be pressed and a feature associated with the button may cause a waveform associated with the selected feature (e.g., debit account information) to be communicated. A different button on a card may, for example, be pressed and a different feature associated with that different button may cause a waveform associated with the different feature (e.g., credit account information) to be communicated.

Different waveforms may be recalled from memory based upon a detected mode of operation by a processor of a card. For example, a processor of a card may detect a presence of a dual-head magnetic stripe reader and may further detect a direction that the card is being swiped through the dual-head magnetic stripe reader. Accordingly, for example, a processor or other device on the card may recall a waveform from a memory of the card that corresponds to a forward swipe direction and may communicate a forward-swipe waveform when a forward swipe direction is detected. Alternately, for example, a processor or other device on the card may recall a waveform from a memory of the card that corresponds to a reverse swipe direction and may communicate a reverse-swipe waveform when a reverse swipe direction is detected.

As per another example, each digital waveform stored within a memory of a card may contain the same magnetic stripe information, but may exhibit different characteristics when communicated to a read-head of a magnetic stripe reader. For example, magnitude representations of the same data symbols within each digital waveform may be different to produce signal magnitude differences when converted to an analog waveform. Alternately, for example, magnitude transitions between the same data symbols within each digital waveform may be different to produce slew rate differences between data transitions in the converted analog waveform.

One or more data symbols of a digital waveform stored within a memory of a card may be modified by a processor or other device on the card prior to being converted and communicated in an analog form. For example, a card may include an environmental sensor (e.g., a temperature sensor) to monitor the ambient surroundings of the card. Accordingly, for example, a processor or other device of the card may receive an ambient temperature reading and may modify a data symbol (e.g., increase or decrease a magnitude represented by each data symbol) of a digital waveform in response to the ambient temperature reading. In so doing, for example, an application running on the processor or other device on the card may determine that such a modification may result in improved communications based upon the ambient temperature reading and may implement the modifications accordingly. Alternately, for example, digital waveforms indexed according to any number of environmental conditions (e.g., ambient temperature or relative humidity) may be stored within a memory of a card and may be retrieved from memory based upon a detected ambient temperature.

Digital waveforms may be downloaded into a card via a programming interface on the card. An IR transceiver, for example, may be provided on a card to receive such waveforms from an IR programming device and may store the waveforms within a memory location on the card (e.g., within an ASIC on the card). Alternately, for example, a light sensor may be provided on a card, so that light pulses emanated from a visual display device (e.g., a kiosk, a merchant terminal, or a computer monitor) may be detected by the light sensor. Such light pulses may be construed by a processor of the card as digital waveforms that may be stored within a memory location on the card.

Digital waveforms may be generated on the card. For example, a card may receive information updates (e.g., new payment account information) from a programming interface (e.g., an IR interface or a Wi-Fi interface) on the card. The new payment account information may then be encoded within a digital waveform by a waveform processor on the card and stored within a memory location of the card. A feature associated with the new payment account may be activated by pressing a button on the card that is associated with the feature. Upon activation of the feature, the digital waveform encoded with the new payment account information may be retrieved from the memory location on the card and an analog waveform may be generated using the retrieved digital waveform.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
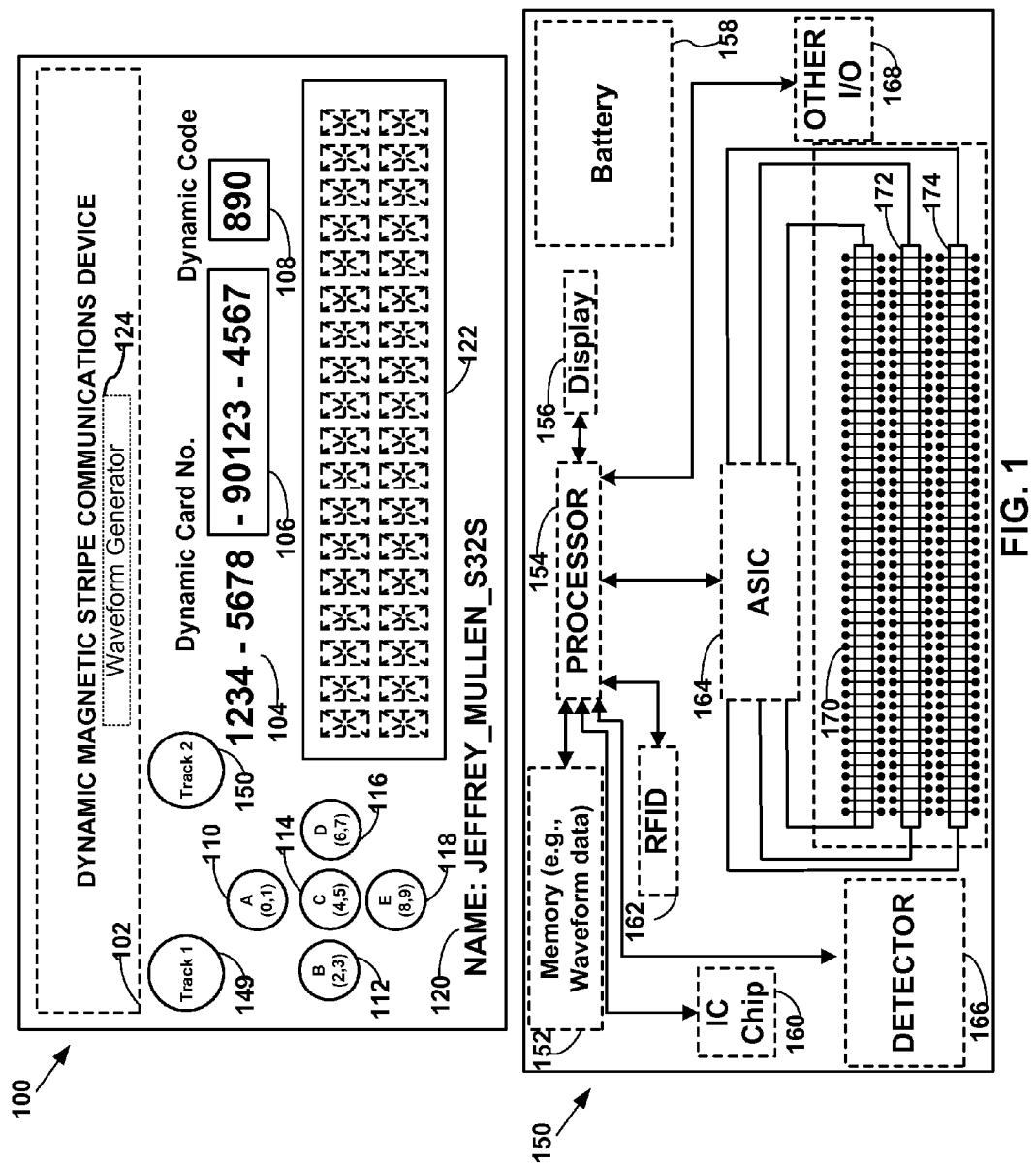
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electro-chromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

For example, one or more buttons 110-118 may be activated in response to indicia displayed on a display (e.g., display 122) that may be associated with corresponding information (e.g., payment account information) that may be stored within a memory of card 100. Alternately, for example, a single button (e.g., button 110) may be pressed multiple times to sequentially display data that may be associated with information (e.g., information associated with multiple payment accounts).

Card 100 may include button 149. Button 149 may be used, for example, to communicate a waveform via waveform generator 124 through dynamic magnetic stripe communications device 102 indicative of a user's desire to communicate a single track of magnetic stripe information. Persons skilled in the art will appreciate that pressing a button (e.g., button 149) may cause information to be communicated through waveform generator 124 when an associated read-head detector detects the presence of a read-head of a magnetic stripe reader. For example, a digital waveform may be extracted from a memory location within card 100 and may be converted to an analog waveform via waveform generator 124. In so doing, a waveform representative of a single track of magnetic stripe information may be communicated to a read head of a magnetic stripe reader.

Button 150 may be utilized to communicate (e.g., after button 150 is pressed and after a read-head detects a read-head of a reader) information indicative of a user selection (e.g., to communicate two tracks of magnetic stripe data). For example, a digital waveform may be extracted from a memory location within card 100 and may be converted to an analog waveform via waveform generator 124. In so doing, a waveform representative of two tracks of magnetic stripe information may be communicated to a read head of a magnetic stripe reader.

Persons skilled in the art will appreciate that a physical payment card may be provided as a virtual payment card on a display of any device, such as a mobile telephonic device or personal computing device. A button on a physical payment card may be a button on any device, such as a mobile telephonic device or personal computing device. Accordingly, for example, a device (e.g., a cell phone) may receive manual input from a manual user interface (e.g., a virtual button on a capacitive touch screen) and communicate information indicative of the selection (e.g., a single track of magnetic stripe data) to another device (e.g., a payment terminal such as a card reader) via a communications device (e.g., an RF-based communications device).

FIG. 1 shows architecture 150, which may include one or more processors 154 and one or more other devices, such as an ASIC, a mixed-signal FPGA, a data acquisition microcontroller or system on a chip (e.g., ASIC 164). Processor 154 and ASIC 164 may be configured to utilize external memory 152, internal memory to processor 154 and/or ASIC 164, or a combination of external memory and internal memory for dynamically storing information, such as executable machine language, related dynamic machine data, user input data values, or any other type of information (e.g., waveform data). Digital waveform data may be stored, retrieved when associated buttons are pressed, converted to an analog waveform, and communicated to a merchant terminal (e.g., via a waveform generator and a dynamic magnetic stripe communications device) to complete a purchase transaction.

ASIC 164 may, for example, include memory to store one or more digital waveforms. ASIC 164 may, for example, include circuitry to read one or more symbols of a digital waveform from memory and modify the one or more symbols based upon inputs received from processor 154. ASIC 164 may, for example, include a DAC that may receive multiple symbols of a digital waveform from memory and may convert each symbol to an analog signal. Each symbol of the digital waveform may be clocked through the DAC at a rate that may be representative of a detected swipe speed of a card (e.g., card 100 of FIG. 1) as it is being swiped through a magnetic stripe reader.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or into proximity with displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included within architecture 150, that may communicate information to a chip reader (e.g., an EMV chip reader). Radio frequency identification (RFID) module 162 may be included within architecture 150 to enable the exchange of information between an RFID reader/writer and a card (e.g., card 100 of FIG. 1).

Other input and/or output devices 168 may be included within architecture 150, for example, to provide any number of input and/or output capabilities on a card (e.g., card 100 of FIG. 1). For example, other input and/or output devices 168 may include an audio device capable of receiving and/or transmitting audible information. Other input and/or output devices 168 may include a Wi-Fi device, such that a card (e.g., card 100 of FIG. 1) may access an open network (e.g., the Internet).

Other input and/or output devices 168 may include a device that exchanges analog and/or digital data using a visible data carrier. For example, light pulses may be received by other input and/or output devices 168 and may be construed by processor 154 as data indicative of information that may be stored in memory (e.g., waveform data stored within memory 152). Other input and/or output devices 168 may include a device, for example, that is sensitive to a non-visible data carrier, such as an infrared data carrier or electromagnetic data carrier.

Persons skilled in the art will appreciate that a card (e.g. card 100 of FIG. 1) may, for example, be a self-contained device that derives its own operational power from one or more batteries 158. Furthermore, one or more batteries 158 may be included, for example, to provide operational power to a card for a period of time (e.g., a period between 2 and 5 years such as approximately 2 years). One or more batteries 158 may be included, for example, as rechargeable batteries.

A dynamic magnetic stripe communications device may be included on a card (e.g., card 100 of FIG. 1) to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by ASIC 164 of one or more coils of one or more electromagnetic elements via, for example, waveform generation circuitry within ASIC 164 may be effective to generate one or more waveforms. One or more electromagnetic field generators 170-174 may be utilized to communicate the one or more waveforms to, for example, one or more read-heads of a magnetic stripe reader.

Timing aspects of information exchange between a card and the various input and/or output devices implemented on the card may be determined by a processor of the card. Detector 166 may be utilized, for example, to sense the proximity and/or actual contact, of an external device, which in turn, may trigger the initiation of a communication sequence. The sensed presence and/or touch of the external device may then be communicated to a controller (e.g., processor 154 or ASIC 164), which in turn may direct the exchange of information between a card (e.g., card 100 of FIG. 1) and the external device. The sensed presence and/or touch of the external device may be effective to, for example, determine the type of device or object detected.

For example, the detection may include the detection of, for example, a read-head of a magnetic stripe reader. In response, ASIC 164 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Detector 166 may, for example, detect a direction and velocity of movement of a read-head of a magnetic stripe reader and report such detected direction and velocity to processor 154. Processor 154 may, in turn, report the direction and velocity of movement to ASIC 164, which may in turn generate one or more waveforms that are compatible with the detected direction and velocity of movement of the detected read-head of the magnetic stripe reader.

Persons skilled in the art will appreciate that processor 154 and/or ASIC 164 may provide user-specific and/or card-specific information through utilization of any one or more buttons (e.g., buttons 110-118 of card 100 of FIG. 1), RFID 162, IC chip 160, electromagnetic field generators 170-174, and other input and/or output devices 168.

Figure 2:
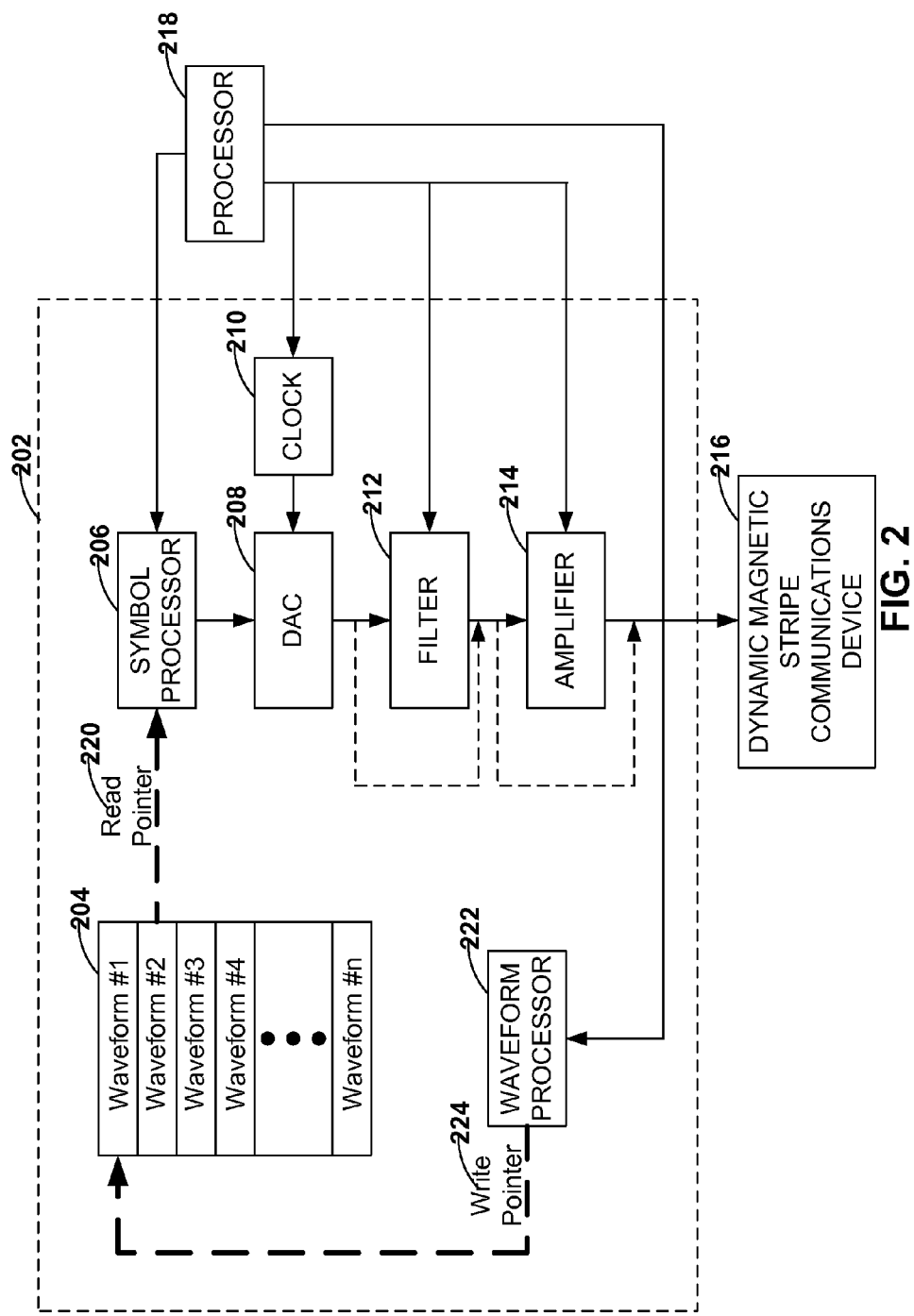
FIG. 2 is an illustration of a card constructed in accordance with the principles of the present invention.

FIG. 2 shows card 200, which may include component 202 (e.g., an ASIC, a mixed-signal FPGA, a data acquisition microcontroller or system on a chip), processor 218, and dynamic magnetic stripe communications device 216. Component 202 may include, for example, memory 204, symbol processor 206, DAC 208, clock generator 210, filter 212, amplifier 214, and waveform processor 222.

Waveform processor 222 may, for example, receive data representative of digital waveforms from an external source (not shown) and may store each digital waveform within memory 204 in accordance with write pointer 224. Waveform processor 222 may, for example, generate digital waveforms that may be stored within memory 204. For example, card 200 may be Wi-Fi enabled to receive information from a network entity that may be associated with payment account updates (e.g., updated rewards points information or updated payment account information). Waveform processor 222 may, for example, generate a digital waveform encoded with the updated rewards points information and may store the digital waveform within memory 204. Upon subsequent selection of a rewards payment feature of card 200, for example, the rewards points encoded waveform may be retrieved from memory 204 and converted to an analog waveform to be communicated by dynamic magnetic stripe communications device 216 to complete a purchase transaction using the updated rewards points information.

Memory 204 may include one or more digital waveforms and/or one or more concatenated portions (e.g., bit periods) of digital waveforms. Each digital waveform, or portion thereof, stored within memory 204 may include one or more symbols of information. Each symbol of information may, for example, define a magnitude and polarity at a particular point in time relative to a beginning (e.g., a first symbol of the waveform) and an ending (e.g., the last symbol of the waveform). Accordingly, for example, each symbol of a waveform may be retrieved (e.g., from a location as defined by read pointer 220) from memory 204 and may be processed by a waveform generator (e.g., symbol processor 206, DAC 208, filter 212, and/or amplifier 214), in accordance with instructions received from processor 218, to generate an analog waveform to be communicated by dynamic magnetic stripe communications device 216.

Each digital waveform stored within memory 204 may be indicative of the same, or different, magnetic stripe information. For example, a first waveform stored within memory 204 may, for example, be representative of a first track of magnetic stripe information that may be communicated by dynamic magnetic stripe communications device 216. A second waveform stored within memory 204 may, for example, be representative of first and second tracks of magnetic stripe information that may be communicated by dynamic magnetic stripe communications device 216. A third waveform stored within memory 204 may, for example, be representative of first, second, and third tracks of magnetic stripe information that may be communicated by dynamic magnetic stripe communications device 216.

As per another example, a first waveform stored within memory 204 may, for example, be representative of payment information (e.g., a debit payment account number) that may be communicated by dynamic magnetic stripe communications device 216 to complete a purchase transaction using the debit payment account number selected by card 200 (e.g., by pressing a button on card 200 associated with the debit payment account number). A second waveform stored within memory 204 may, for example, be representative of different payment information (e.g., a credit payment account number) that may be communicated by dynamic magnetic stripe communications device 216 to complete a purchase transaction using the credit payment account number selected by card 200 (e.g., by pressing a button on card 200 associated with the credit payment account number).

Digital waveforms stored within memory 204 may, for example, represent the same magnetic stripe information, but may exhibit different characteristics. For example, a first waveform may define signal characteristics that are known to be optimal based upon a particular type of magnetic stripe reader that card 200 is being presented to. Accordingly, for example, processor 218 may detect a particular type of magnetic stripe reader (e.g., a motorized magnetic stripe reader) and may instruct symbol processor 206 to retrieve a waveform from memory 204 via read pointer 220 that has been optimized for use with motorized magnetic stripe readers.

As per another example, processor 218 may detect that card 200 is being presented to, for example, a dual-head magnetic stripe reader. In addition, processor 218 may detect a swipe direction that card 200 is being swiped through the dual-head magnetic stripe reader. Accordingly, for example, a waveform having symbols arranged in a forward direction may be retrieved by symbol processor 206, converted to an analog waveform, and communicated by dynamic magnetic stripe communications device 216 in response to a forward-direction swipe being detected by processor 218. Alternately, for example, a waveform having symbols arranged in a reverse direction may be retrieved by symbol processor 206, converted to an analog waveform, and communicated by dynamic magnetic stripe communications device 216 in response to a reverse-direction swipe being detected by processor 218.

Symbol processor 206 may, for example, retrieve all symbols of a digital waveform from memory 204 and may provide each symbol to DAC 208 to be converted to an analog waveform. Processor 218 may select a clock rate that is to be generated by clock generator 210 in order to select the rate at which each waveform symbol is converted to an analog signal. Accordingly, processor 218 may select a rate at which the digital waveform retrieved from memory 204 is converted to an analog waveform. In so doing, for example, processor 218 may detect a rate at which card 200 is swiped through a magnetic stripe reader and may, in turn, select a rate at which a digital waveform is converted to an analog waveform so as to be consistent with the detected swipe speed of card 200. Processor 218 may, for example, select a slower conversion rate (e.g., by selecting a slower clock speed of clock generator 210) when the detected swipe speed of card 200 is relatively slow. Processor 218 may, for example, select a faster conversion rate (e.g., by selecting a faster clock speed of clock generator 210) when the detected swipe speed of card 200 is relatively fast.

Symbol processor 206 may, for example, modify digital waveform symbols retrieved from memory 204 before being applied to DAC 208 for conversion. For example, symbol processor 206 may apply digital signal processing techniques (e.g., digital filtering) to the digital waveform symbols retrieved from memory 204. The analog waveform generated by DAC 208 may be optionally filtered by filter 212 (e.g., based upon control signals received from processor 218) to, for example, remove frequency components (e.g., high frequency components) that may be generated by the digital-to-analog conversion process of DAC 208. The analog waveform generated by DAC 208 may be optionally amplified by amplifier 214 based upon, for example, control signals received from processor 218.

Figure 3:
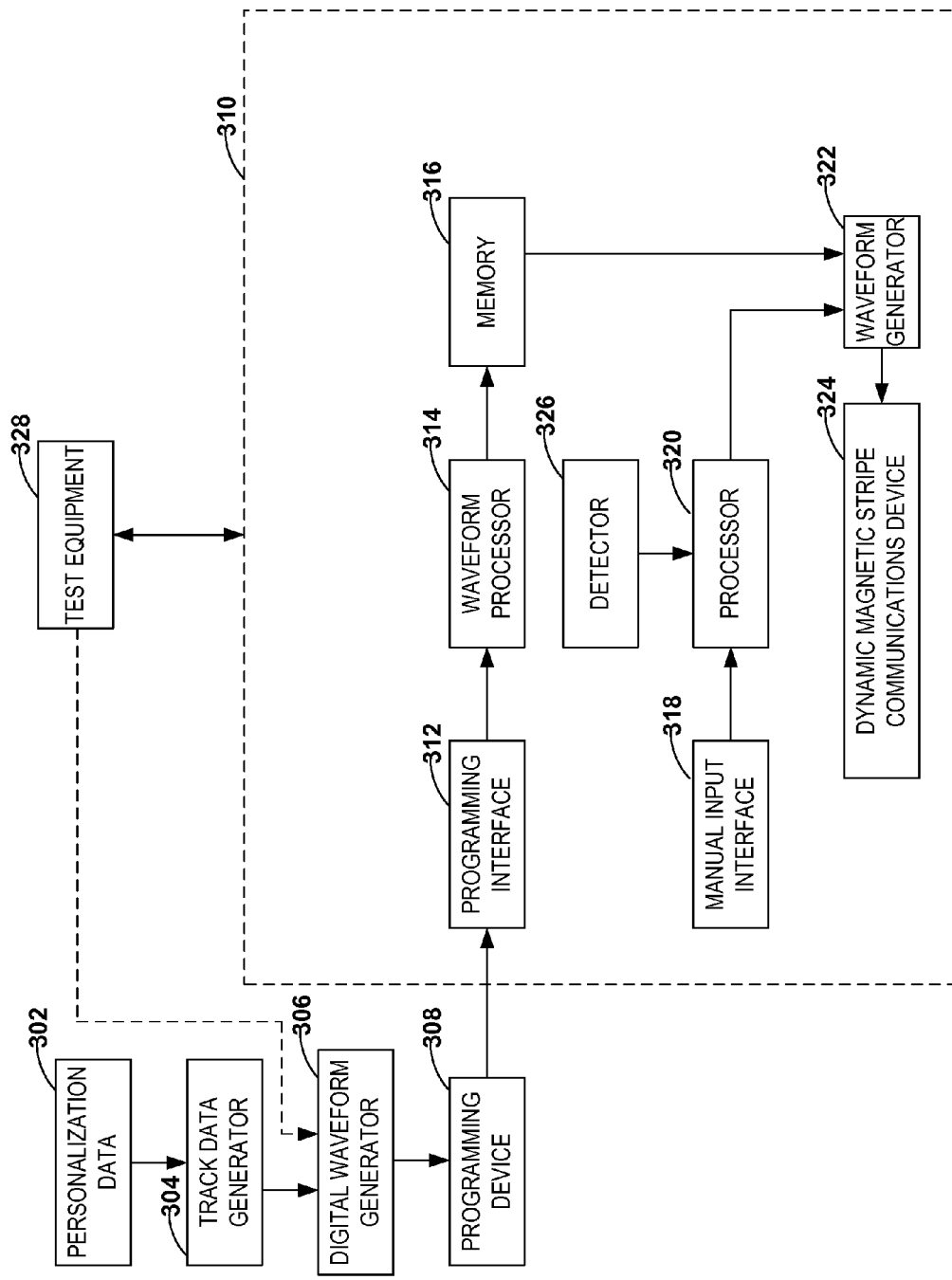
FIG. 3 is an illustration of a system constructed in accordance with the principles of the present invention.

FIG. 3 shows system 300, which may include personalization data 302, track data generator 304, digital waveform generator 306, programming device 308, test equipment 328, and card 310. Personalization data 302 may, for example, contain information that is specific to card 310 as well as information that is specific to the cardholder of card 310. For example, personalization data 302 may contain the name and address of the cardholder, payment account information associated with the one or more payment accounts that may be owned by the cardholder, and expiration dates of the various payment accounts.

For each payment account that may be associated with card 310, an associated magnetic stripe message may be generated by track data generator 304. For example, a magnetic stripe message may contain one, two, and/or three tracks of magnetic stripe information and may define payment account and cardholder information that may be used to complete a purchase transaction. The magnetic stripe message may, for example, be encoded (e.g., F2F encoded) such that a logic "1" may be encoded as a data transition within any bit period and a logic "0" may be encoded as a lack of a data transition within any bit period.

Digital waveform generator 306 may, for example, receive the magnetic stripe message from track data generator 304 and may represent the magnetic stripe message as a series of digital symbols. The series of digital symbols may digitally approximate a waveform that would be generated if the same magnetic stripe message were encoded onto a magnetic stripe and then passed across a read-head of a magnetic stripe reader.

Digital waveform generator 306 may, for example, receive test result information from test equipment 328. For example, card 310 may be subjected to a number of characteristic test scenarios via test equipment 328 that may be used to determine performance characteristics of card 310. Such performance characteristics may, for example, be a result of physical attributes (e.g., process variation or battery voltage variation) that may be different for each card 310 being tested. Accordingly, for example, digital waveform generator 306 may utilize the performance characteristics determined by test equipment 328 to modify the generated digital symbols to compensate for the measured performance characteristics.

As per an example, a decreased amplitude of a signal generated by dynamic magnetic stripe communications device 324, as tested by test equipment 328, may be compensated by increasing a digital magnitude represented by one or more digital symbols generated by digital waveform generator 306. Similarly, an increased amplitude of a signal generated by dynamic magnetic stripe communications device 324, as tested by test equipment 328, may be compensated by decreasing a digital magnitude represented by one or more digital symbols generated by digital waveform generator 306.

Programming device 308 may be any programming device capable of communicating data to programming interface 312 of card 310. For example, programming device 308 and programming interface 312 may be transceivers that may exchange information via light pulses (e.g., IR light pulses). As per another example, programming device 308 may be any monitor (e.g., a computer display, a kiosk display, a laptop computer display, a television display, or a merchant terminal display) and programming interface 312 may be a light sensor that may detect pulses of light emanating from programming device 308. Such light pulses may be construed as data that defines a digital waveform. As per yet another example, programming interface 312 may be a Wi-Fi device that may receive programming information from programming device 308 over a network connection (e.g., an internet connection).

Waveform processor 314 may receive data from programming interface 312 and may construe such data as data symbols that may define a digital waveform. Each digital waveform may be arranged as a block of data symbols within memory 316 and may be retrieved from memory 316 by waveform generator 322, converted to an analog waveform by waveform generator 322, and then presented to dynamic magnetic stripe communications device 324 for communication.

Memory 316 may, for example, store many digital waveforms. Each waveform may, for example, represent a magnetic stripe message that may be communicated by dynamic magnetic stripe communications device 324 to a read-head of a magnetic stripe reader. Each waveform stored within memory 316 may, for example, represent a different payment account that may be used to complete a purchase transaction.

Manual input interface 318 may, for example, be one or more buttons that may be associated with one or more features (e.g., payment features) that may be selected on card 310. Once a feature is selected via manual input interface 318, processor 320 may communicate such a selection to waveform generator 322, which may then retrieve data symbols from memory 316 that may be representative of a waveform that may be associated with the selected feature. Waveform generator 322 may then perform functions such as digital signal processing, digital-to-analog conversion, analog filtering, and amplification on the retrieved data symbols to generate an analog waveform that may be communicated by dynamic magnetic stripe communications device 324 to a read-head of a magnetic stripe reader. Persons skilled in the art will appreciate that any waveform generated by waveform generator 322 may be presented to dynamic magnetic stripe communications device 324 when, for example, detector 326 detects a presence of a read-head of a magnetic stripe reader.

Detector 326 may, for example, detect environmental conditions (e.g., ambient temperature or humidity) within which card 310 may be operating. Accordingly, for example, a different waveform may be selected from memory 316 by waveform generator 322 based upon the detected environmental conditions. A digital waveform representative of payment account information may, for example, be stored within memory 316 that may be optimized for use under normal environmental conditions (e.g., moderate temperature or moderate humidity conditions). Another waveform representative of the same payment account information may, for example, be stored within memory 316 that may be optimized for use under extreme environmental conditions (e.g., extreme hot or cold temperature conditions or extremely humid or dry conditions).

Detector 326 may, for example, detect the presence of a particular type of magnetic stripe reader, which may then be determinative of which waveform from memory 316 is selected for use. For example, a detected magnetic stripe reader may be known by processor 320 as being more receptive to certain waveform characteristics (e.g., signal magnitude and/or signal slew rate). Accordingly, for example, a waveform that may be optimized for use with the detected magnetic stripe reader may be retrieved from memory 316 and may be communicated to a read-head of the detected magnetic stripe reader during a transaction (e.g., a purchase transaction).

Detector 326 may, for example, detect performance characteristics of card 310. Such performance characteristics may include, for example, power supply (e.g., battery) voltage magnitude variation. Accordingly, for example, a waveform that may be optimized (e.g., lower slew rate and/or lower signal magnitude) for use with the detected performance characteristics (e.g., reduced battery voltage) may be retrieved from memory 316 and may be communicated to a read-head of the detected magnetic stripe reader during a transaction (e.g., a purchase transaction).

Waveform generator 322 may, for example, convert data symbols retrieved from memory 316 to produce analog waveform characteristics as a result of detection signals received from detector 326 and/or processor 320. For example, data symbols retrieved from memory 316 may be modified to produce waveform characteristics that are optimized for use with a detected magnetic stripe reader type. As per another example, data symbols retrieved from memory 316 may be modified based on environmental signals received from detector 326 (e.g., excessive hot or cold conditions) so as to generate analog waveforms from the retrieved data symbols that may be more effective when communicated in the detected environmental conditions.

As per yet another example, data symbols retrieved from memory 316 may be modified based on other parameters (e.g., supply voltage degradation) that may be detected by a monitoring device (e.g., a battery voltage meter) of a card. Accordingly, for example, data symbols retrieved from memory 316 may be modified to generate analog waveforms with better power efficiency (e.g., reduced magnitude and/or reduced slew rate) so as to reduce an amount of power consumed when communicated by dynamic magnetic stripe communications device 324.

Figure 4:
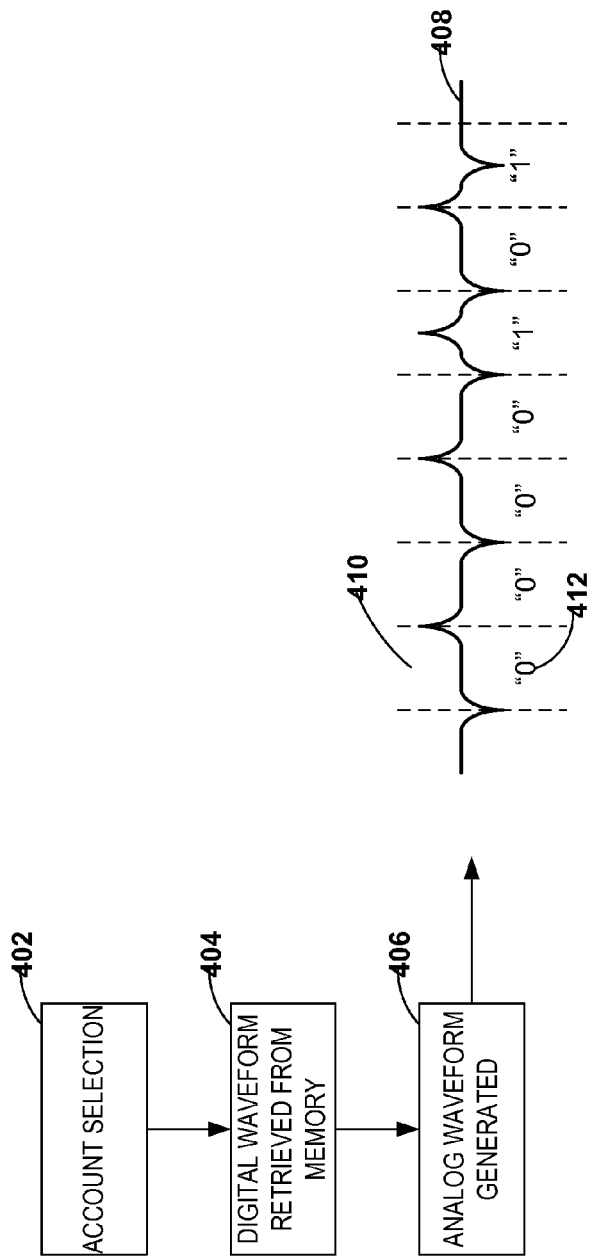
FIG. 4 is an illustration of a signal flow constructed in accordance with the principles of the present invention.

FIG. 4 shows a signal flow which may include steps 402-406 to produce waveform 408 that may be communicated by a card. In step 402, a cardholder may select a payment account that may be associated with a card by, for example, pressing a button on the card that may be associated with a feature (e.g., a payment feature using a debit account). In step 404, one or more of many digital waveforms may be retrieved from memory as an array of symbols that represent a waveform encoded with a magnetic stripe message containing one, two, and/or three tracks of magnetic stripe data. Such a magnetic stripe message may include, for example, account and account holder information associated with the payment account feature as selected by the cardholder in step 402.

In step 406, the magnetic stripe message may be converted from a digital format to an analog format to produce waveform 408. In particular, a DAC may be used to convert each digital symbol into an analog signal (e.g., a current signal having a magnitude that is proportional to a digital value of the digital symbol and a polarity as defined by a sign bit of the digital symbol). Each digital symbol may be converted to its analog equivalent at a rate that may be defined by a frequency of a clock signal that is provided to the DAC. Successive conversions of all digital symbols to their analog equivalents may, for example, be effective to generate an analog waveform (e.g., waveform 408) as may be communicated by a dynamic magnetic stripe communications device of a card.

Accordingly, for example, the time duration of waveform 408 may be selected by the frequency of the DAC clock signal. In so doing, a frequency of a DAC clock signal may be used to select an amount of time required to communicate waveform 408. For example, a DAC clock signal frequency may be used to select a period of time (e.g., bit period 410) that may be exhibited by an average bit period of waveform 408.

A frequency that data bits (e.g., data bit 412) encoded within waveform 408 may be communicated may, for example, be selected based upon a frequency of the DAC clock signal. Accordingly, for example, the DAC clock signal may be accelerated to reduce bit period 410, thereby increasing a rate of bit period transitions during an emulated swipe event, which may then be effective to emulate a relatively fast swipe of a card through a magnetic stripe reader. Alternately, for example, the DAC clock signal may be retarded to increase bit period 410, thereby decreasing a rate of bit period transitions during an emulated swipe event, which may then be effective to emulate a relatively slow swipe of a card through a magnetic stripe reader.

Figure 5:
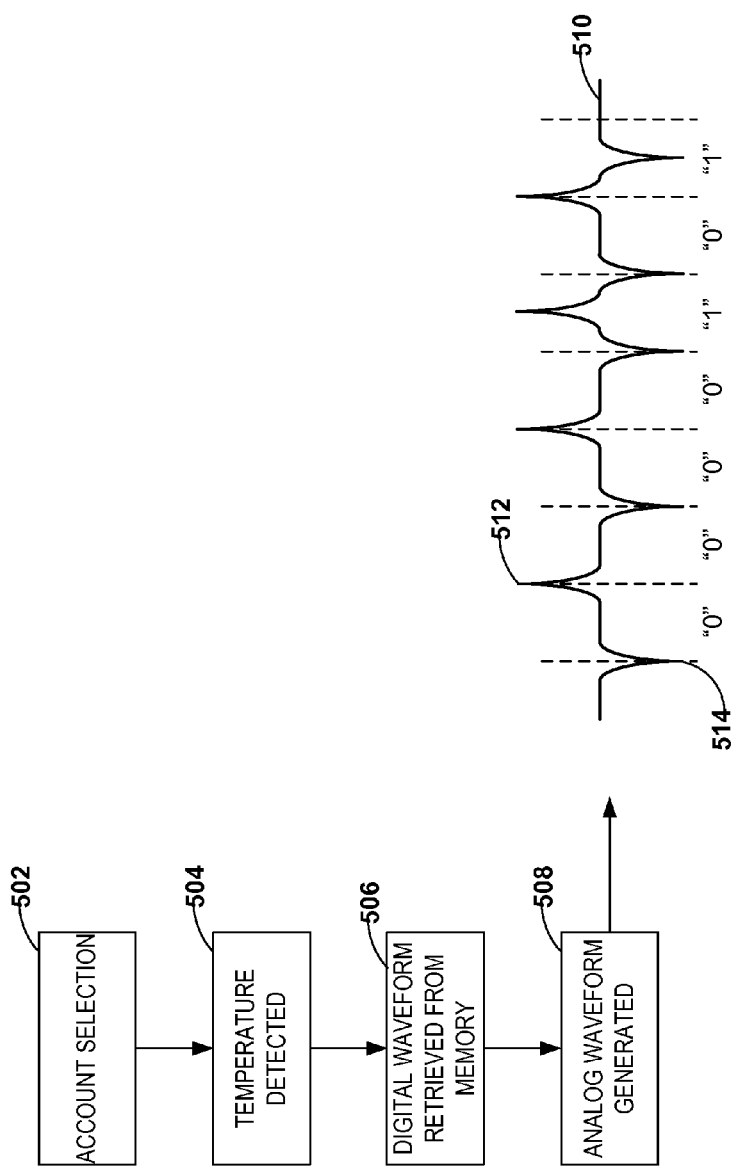
FIG. 5 is an illustration of a signal flow constructed in accordance with the principles of the present invention.

FIG. 5 shows a signal flow which may include steps 502-508 to produce waveform 510 that may be communicated by a card. In step 502, a user may select a feature on a card by pressing a button associated with the feature. For example, a user may choose to conduct a purchase transaction using rewards points earned through spending activity associated with a credit account. Two or more digital waveforms having the same account information (e.g., rewards account information) encoded within each waveform may be stored within a memory of a card. Each numerical representation of a waveform having the same account information encoded within the waveform may, for example, exhibit different characteristics that may be useful depending upon an environment that the card may be operating within.

For example, a temperature detector of a card may detect an ambient temperature (e.g., as in step 504) of the environment that a card may be operating within. A processor of a card may, for example, select a digital waveform (e.g., as in step 506) that contains the requested account information (e.g., the requested rewards account information), but that also exhibits characteristics that are known to a processor of the card to be optimal based upon a card's detected ambient temperature. Accordingly, successive conversion of all symbols of the selected digital waveform may yield waveform 510 (e.g., as in step 508) having optimized characteristics (e.g., extended amplitudes 512 and 514) that may be known to a processor of a card to be optimized when the card is used in the detected ambient temperature of step 504.

Persons skilled in the art will appreciate that modifying any characteristic of an analog signal may yield optimized results. Accordingly, other characteristics (e.g., rate of change of an amplitude of a signal) may be used to optimize communication of a waveform. Persons skilled in the art will further appreciate that other environmental factors (e.g., relative humidity) may be detected which may effect other characteristic changes to be employed within a waveform to optimize communication of the waveform.

Figure 6:
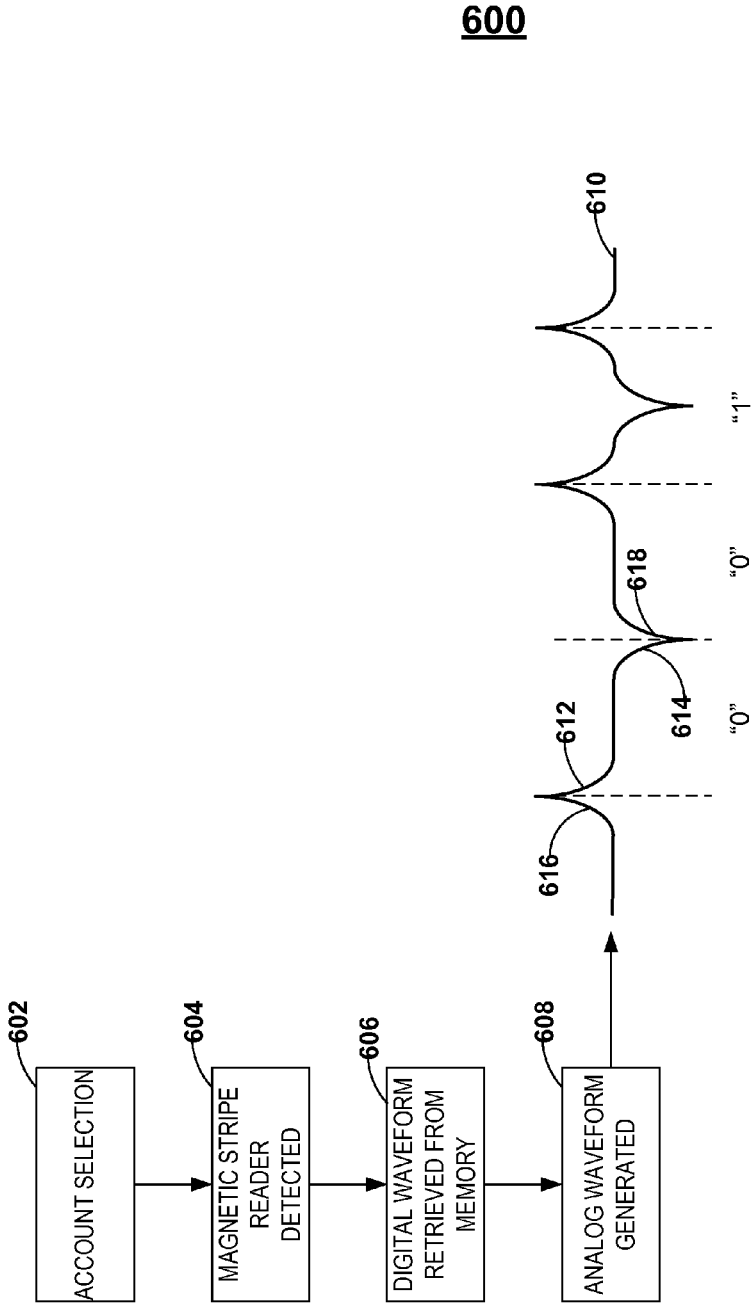
FIG. 6 is an illustration of a signal flow constructed in accordance with the principles of the present invention.

FIG. 6 shows a signal flow which may include steps 602-608 to produce waveform 610 that may be communicated by a card. In step 602, a user may select a payment account (e.g., a debit account) for use during a payment transaction and may press a button associated with the debit account purchase feature. In step 604, a magnetic stripe reader may be detected, which may include a detection of a particular type of magnetic stripe reader. A digital waveform may be retrieved from memory (e.g., as in step 606) that conforms both to the user's selection of a debit account feature and the detected magnetic stripe reader type. For example, multiple digital waveforms may be stored within a memory of a card that contain the debit payment account information encoded within the waveform. In addition, each of the digital waveforms may exhibit certain characteristics that may be known to a processor of a card or device to be effective with certain types of detected magnetic stripe readers. Accordingly, for example, an analog waveform may be generated (e.g., as in step 608) from a digital waveform stored within memory of a card encoded with characteristics (e.g., reduced slew rate 612-618) that may be known to be effective with the magnetic stripe reader as detected in step 604.

Figure 7:
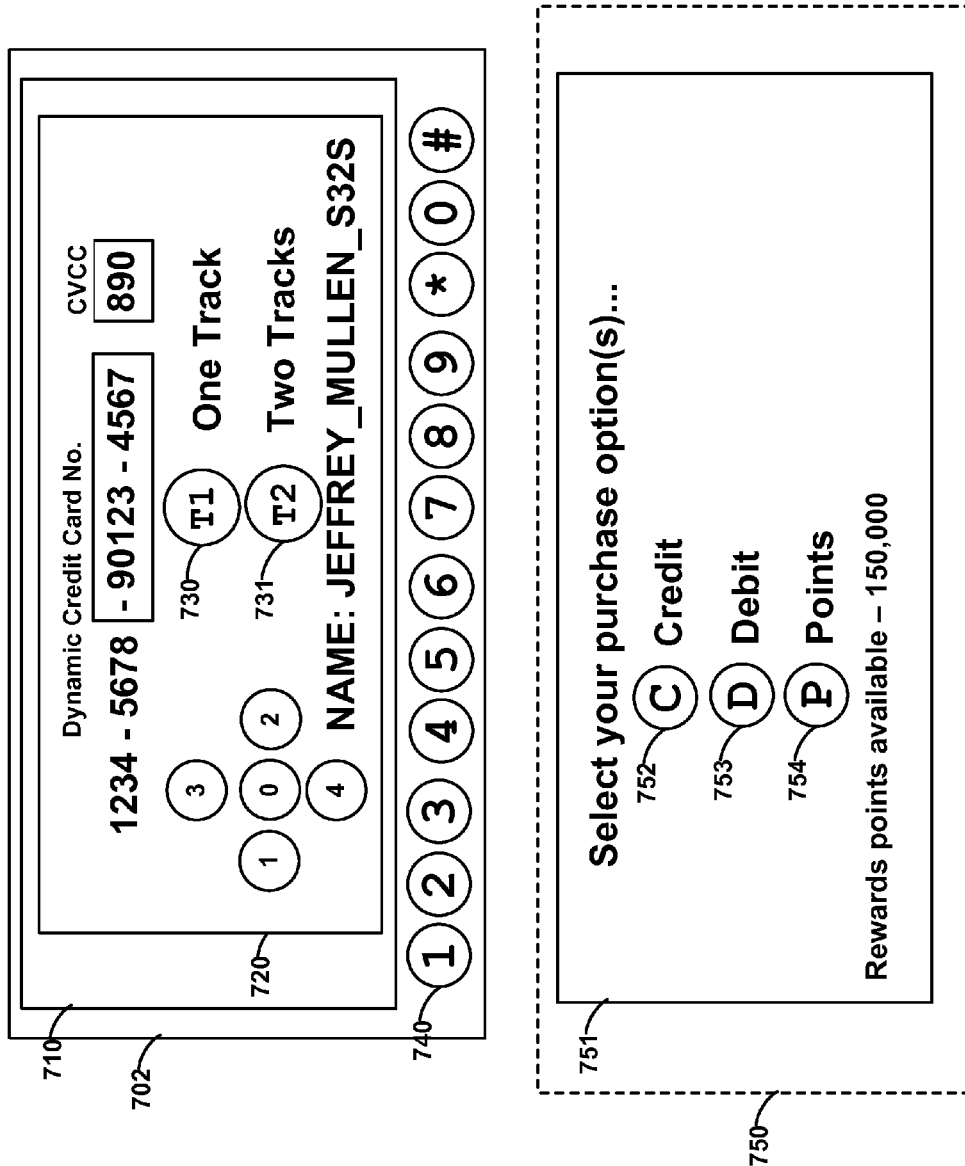
FIG. 7 is an illustration of a mobile device constructed in accordance with the principles of the present invention.

FIG. 7 shows device 700 that may be, for example, a mobile telephonic device such as a mobile cellular phone. Any card provided herein may be provided as a virtual card on device 700. Mechanical buttons 740 may be utilized by a user to make selections (e.g., selections associated with a virtual card). Virtual buttons may be included that a user can activate (e.g., by utilizing a touch-screen displaying a virtual card) so that the user can make selections associated with the virtual card. Device 700 may include, for example, housing 702, display 710, virtual card 720, and virtual buttons 730 and 731. Device 700 may communicate to a card reader via electromagnetic signals (e.g., RF signals) or electromagnetic waveforms. Virtual button 730 may, for example, be associated with communicating a waveform encoded with one track of magnetic stripe data. Virtual button 731 may, for example, be associated with communicating a waveform encoded with two tracks of magnetic stripe data.

Display configuration 750 may be provided and may be displayed, for example, on a wireless device such as a wireless telephonic device or a wireless payment card. Configuration 750 may include graphical user interface 751 that may include, for example, virtual button 752, virtual button 753, and virtual button 754. A user may be provided with feature selections, such as a credit feature, a debit feature or a points feature, so that such a feature may be selected as a payment method that may be used to complete a purchase transaction. A user may perform a selection by pressing the virtual button associated with the selection. Information associated with the selection may be provided, for example, to a remote server (e.g., via a telephonic data communication) and/or a card (e.g., via light and/or sound pulses). A user may select one or more buttons on a physical or virtual card that are labeled as, for example, a "Credit" button, a "Debit" button, and/or a "Points" button. Information indicative of that selection may then be communicated from the card or device to a card reader (e.g., via an analog waveform) and then provided to a payment server. The payment server may then complete a purchase transaction using the payment information received.

Graphical user interface 751 may, for example, provide an update as to the total reward points that may have been accumulated by an account holder's payment (e.g., credit) account. Accordingly, for example, a user of device 700 may be updated as to the number of reward points that may have accrued. In so doing, a waveform generator within device 700 may generate a digital waveform encoded with the rewards points payment information and may store the digital waveform within a memory of device 700. Upon selection of virtual button 754 at the point of sale, the digital waveform may be retrieved from memory and converted to an analog waveform. The analog waveform may then be communicated to complete a purchase transaction using the rewards points information.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A device comprising:
   a magnetic stripe emulator operable to communicate an analog waveform encoded with at least one track of magnetic stripe data to a magnetic stripe reader; and
   a waveform generator operable to generate said analog waveform from a digital representation of said at least one track of magnetic stripe data,
   wherein said device is operable to retrieve said digital representation from a plurality of digital representations of said at least one track of magnetic stripe data.

2. The device of claim 1, further comprising a detector, wherein said digital representation is retrieved from a memory of said device based on a type of magnetic stripe reader detected by said detector.

3. The device of claim 1, further comprising a detector, wherein said digital representation is retrieved from a memory of said device based on a swipe direction detected by said detector.

4. The device of claim 1, further comprising a detector, wherein said analog waveform is generated based on a swipe speed detected by said detector.

5. The device of claim 1, further comprising a button, wherein said digital representation is retrieved from a memory of said device based on a signal from said button.

6. The device of claim 1, further comprising a button, wherein said digital representation is retrieved from a memory of said device based on a signal from said button, said digital representation associated with a payment account number.

7. The device of claim 1, wherein said analog waveform is encoded with two tracks of magnetic stripe data.

8. The device of claim 1, wherein said analog waveform is encoded with three tracks of magnetic stripe data.

9. A system, comprising:
   a card including,
   a magnetic stripe emulator operable to communicate an analog waveform encoded with at least one track of magnetic stripe data, and
   a programming interface; and
   a programming device operable to communicate data to said programming interface, said data including multiple representations of said at least one track of magnetic stripe data.

10. The system of claim 9, further comprising test equipment operable to measure performance characteristics of said card, wherein said data is modified based on said performance characteristics.

11. The system of claim 9, wherein said programming interface is an infrared receiver.

12. The system of claim 9, wherein said programming interface is a light sensor.

13. The system of claim 9, wherein said programming device is a computer display, and wherein said programming interface is a light sensor.

14. The system of claim 9, wherein said programming device is a television display, and wherein said programming interface is a light sensor.

15. The system of claim 9, wherein said programming interface is a Wi-Fi device.

16. A method, comprising:
   selecting a payment account associated with a payment card;
   selecting one of a plurality of digital representations of said selected payment account from a memory of said payment card;
   converting said digital representation to an analog waveform; and
   communicating said analog waveform from said payment card to complete a purchase transaction.

17. The method of claim 16, wherein said digital representation is selected based on environmental conditions detected by said payment card.

18. The method of claim 16, wherein said digital representation is converted based on environmental conditions detected by said card.

19. The method of claim 16, further comprising detecting a magnetic stripe reader, wherein said digital representation is selected based on said detected magnetic stripe reader.

20. The method of claim 16, further comprising detecting performance characteristics of said payment card, wherein said digital representation is selected based on said performance characteristics.

* * * * *